United States Patent [19]

Furtek et al.

[11] Patent Number: 5,118,648

[45] Date of Patent: Jun. 2, 1992

[54] PARTICULATE POLYMER-SUPPORTED OLEFIN POLYMERIZATION CATALYST

[75] Inventors: Allan B. Furtek, Warren, N.J.; Binnur Z. Gunesin, New York, N.Y.

[73] Assignee: Mobil Oil Corporation, Fairfax, Va.

[21] Appl. No.: 551,679

[22] Filed: Jul. 9, 1990

Related U.S. Application Data

[63] Continuation of Ser. No. 253,935, Oct. 5, 1988, abandoned, which is a continuation of Ser. No. 937,858, Dec. 4, 1986, abandoned.

[51] Int. Cl.⁵ .......................... C08F 4/654; C08F 4/64
[52] U.S. Cl. .................................... 502/116; 502/103; 502/109; 502/113; 502/115; 502/118; 502/125; 502/126; 502/127; 526/116; 526/125
[58] Field of Search ............... 502/103, 109, 113, 115, 502/118, 125, 126, 127, 116

[56] References Cited

U.S. PATENT DOCUMENTS

| | | | |
|---|---|---|---|
| 3,135,809 | 6/1964 | Bosmajian | 582/103 X |
| 3,357,158 | 12/1967 | Hollis | 55/67 |
| 3,458,976 | 8/1969 | Hollis | 55/386 |
| 4,481,301 | 11/1984 | Nowlin et al. | 502/120 X |
| 4,560,671 | 12/1985 | Gross et al. | 502/105 |
| 4,568,730 | 2/1986 | Graves | 526/159 |
| 4,632,912 | 12/1986 | Bedell et al. | 502/122 |
| 4,690,825 | 9/1987 | Won | 424/501 |
| 4,900,706 | 2/1990 | Sasaki et al. | 502/116 |

FOREIGN PATENT DOCUMENTS

| | | | |
|---|---|---|---|
| 0168317 | 1/1986 | European Pat. Off. | |
| 465819 | 6/1978 | U.S.S.R. | 502/109 |
| 682262 | 9/1979 | U.S.S.R. | 502/109 |

OTHER PUBLICATIONS

Ser. No. 253,803, filed on Oct. 5, 1988.
McDaniel et al., *Journal of Polymer Science: Polymer Chemistry Edition*, vol. 19, 1967–1976 (1981).
Shida et al., *Polymer Preprints* (ACS Division of Polymer Chemistry), 24(1), pp. 110–111 (1983).
Hogan et al., *Journal of Applied Polymer Science: Applied Polymer Symposium*, 36, 49–60 (1981).
Smith, *Chemical Engineering Kinetics*, 3rd Edition, McGraw-Hill (1981) pp. 334 and 335.
Ran et al., "A New Polymer Supported Catalyst-A Complex of Polystyrene-Titanium Tetrachloride", *Polymer Communications*, No. 5, Oct. 1985 (China).

*Primary Examiner*—Patrick P. Garvin
*Attorney, Agent, or Firm*—Alexander J. McKillop; Charles J. Speciale; Marina V. Schneller

[57] ABSTRACT

Supported olefin, e.g., alpha-olefin, polymerization catalyst compositions, such as Ziegler-Natta catalysts, are modified by using porous, polymer particles having an average pore diameter of at least about 10 Å as the catalyst support. The resulting catalyst composition is more active than refractory oxide-supported catalysts and it is not susceptible to deactivation by catalyst poisons, such as oxygen or water. Additionally, the polymer particles need not be calcined prior to the catalyst synthesis.

43 Claims, 2 Drawing Sheets

PARTICULATE POLYMER-SUPPORTED OLEFIN POLYMERIZATION CATALYST

This is a continuation of Ser. No. 253,935, filed on Oct. 5, 1988, and now abandoned, which was a continuation of copending application Ser. No. 937,858, filed on Dec. 4, 1986, and now abandoned.

BACKGROUND OF THE INVENTION

1. Field of the Invention

The present invention relates to an improved catalyst for polymerizing olefins, a method for producing such a catalyst and to a method of polymerizing olefins, preferably alpha-olefins, with such a catalyst. A particular aspect of the present invention relates to a method for preparing a high activity olefin catalyst composition, supported on a novel support, which is not sensitive to usual olefin polymerization catalyst poisons.

2. Description of the Prior Art

Linear low density polyethylene polymers possess properties which distinguish them from other polyethylene polymers, such as ethylene homopolymers. Certain of these properties are described by Anderson et al, U.S. Pat. No. 4,076,698.

Karol et al, U.S. Pat. No. 4,302,566, describe a process for producing certain linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support, e.g., silica, with both an organoaluminum compound and an organomagnesium compound followed by contacting the treated support with a tetravalent titanium compound.

Stevens et al, U.S. Pat. No. 3,787,384, and Stroebel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Nowlin et al, U.S. Pat. No. 4,481,301, disclose a supported alpha-olefin polymerization catalyst composition prepared by reacting a support containing OH groups with a stoichiometric excess of an organomagnesium composition, with respect to the OH groups content, and then reacting the product with a tetravalent titanium compound. The thus-obtained catalyst is then activated with a suitable activator, e.g., disclosed by Stevens et al, U.S. Pat. No. 3,787,384 or by Stroebel et al, U.S. Pat. No. 4,148,754. The preferred activator of Nowlin et al is triethyl-aluminum. Nowlin et al, U.S. Pat. No. 4,605,638 and Nowlin, U.S. Pat. No. 4,593,009, disclose variations of the catalyst composition of the Nowlin et al U.S. Pat. No. 4,481,301.

Karol et al, European Patent Application 84103441.6, filed Mar. 28, 1984, Publication Number 0 120 503, published on Oct. 3, 1984, disclose a catalyst composition prepared in a process comprising forming a precursor composition from a magnesium compound, a titanium compound and an electron donor compound and then diluting the precursor composition with an inert carrier, such as silica.

The entire contents of all of the aforementioned publications, patents and patent applications are incorporated herein by reference.

Silica, alumina or silica-alumina cogels have been commonly used in the past as supports for Ziegler alpha-olefin polymerization catalysts. Such refractory support materials are available in a variety of particle sizes and porosities and their usefulness as catalyst supports is well documented in the art. However, such supports have several deficiencies. For example, they must be calcined at high temperatures to remove water which is a common catalyst poison. In addition, they have a limited maximum pore size which restricts catalyst performance. It has been found that increased pore size improves the properties of Ziegler alpha-olefin polymerization catalysts, e.g., see copending application, Ser. No. 805,634, filed on Dec. 6, 1985 and now abandoned. Unfortunately, large pore size refractory materials may be friable and the use thereof as catalyst supports may lead to the formation of unwanted fine particles through attrition. Additionally, refractory oxide support materials readily adsorb commonly-occurring catalyst poisons, such as oxygen and water.

Refractory oxide supports have also been commonly used as supports for catalysts used to polymerize olefins other than alpha-olefins, such as styrene, and derivatives thereof. The use of refractory oxide supports for such vinyl olefins catalysts also presents some practical and operational problems.

Accordingly, a need still exists in the art for providing an improved supported catalyst composition which is relatively insensitive to catalyst poisons and non-friable and the support material of which need not necessarily be dehydrated, thereby reducing the overall cost of preparation of the catalyst composition.

These and other objects of the invention will become apparent to those skilled in the art from the following description thereof and the appended claims.

SUMMARY OF THE INVENTION

A novel, supported olefin polymerization catalyst composition is prepared by using porous polymer particles as the support. The porous polymer particles have an average pore diameter of at least about 10 Angstroms and they are preferably chemically inert with respect to the olefins.

DETAILED DESCRIPTION OF THE INVENTION

The porous polymer particles used as the support in accordance with the present invention are used in the synthesis in the form of a distinct particulate material which becomes a support for the olefin polymerization catalyst. In this respect, the use of the porous, cross-linked polymer particles as a catalyst support is distinct from the use of the polymeric materials as supports in prior art for olefin polymerization catalyst compositions. The porous, polymer support of this invention is utilized in the form of distinct, spherical, porous particles to support catalytically-active ingredients on such distinct, pre-formed, spherical, porous particles. In contrast, polymeric materials used in prior art as catalyst supports were utilized in the form of at least partially softened polymer resins having catalytically-active ingredients mixed into the resins to form a substantially homogeneous mass which was subsequently pelletized or extruded into catalyst particles (e.g., see Graves, U.S. Pat. No. 4,568,730).

The polymer particles have spherical shape with the particle diameter of about 1 to about 300 microns, preferably about 10 to about 150 microns and most preferably about 10 to about 110 microns. The particles are preferably chemically inert with respect to water, oxygen, organic solvents, organometallic compounds and halides of transition metals and have the characteristics of a free-flowing powder. They are preferably cross-linked by any conventional means, such as by cross-linking agents, e.g., divinylbenzene, para-vinylstyrene, para-methylstyrene and trimethylacrylate under conventional cross-linking conditions, or by electromagnetic radiation in a conventional manner, e.g., see KIRK-OTHMER ENCYCLOPEDIA OF CHEMICAL TECHNOLOGY, Third Edition, Volume 19, pages 607–624, John Wiley and Sons, New York (1982), the contents of which are incorporated herein by reference. The polymer particles must have the porosity of about 0.001 to about 10 cc/gm, a surface area of about 1 to about 1,000 m$^2$/gm and calculated average pore diameter as set forth below.

The average pore diameter, PD in Angstroms, is calculated from the measured values of pore volume and surface area from the following equation:

$$PD = \frac{PV}{SA} \times 40,000$$

where PV is pore volume, in cc/gm, and SA is surface area, in m$^2$/gm.

Surface area is measured by the well known BET liquid nitrogen absorption technique, while pore volume is measured by determining the amount of nitrogen (N$_2$) absorbed by the pores of a sample at such pressure and temperature conditions that the nitrogen condenses as a liquid into the pores. The porous polymer particle must have the average calculated pore diameter of at least about 10, preferably at least about 20 and most preferably at least about 50 Angstroms (Å). The polymer particles may have any combination of pore volume and surface area which would assure that the particles have the aforementioned average calculated pore diameter. For purposes of exemplification, the particles may have pore volume of at least about 0.001 cc/gm, preferably at least about 0.01 cc/gm and most preferably at least about 0.1 cc/gm, and the surface area of at least about 4 m$^2$/gm, preferably at least about 20 m$^2$/gm and most preferably at least about 80 m$^2$/gm, respectively. The polymer particles may be manufactured from any suitable polymers, including thermoplastic, thermoset, semicrystalline, amorphous, linear, branched or cross-linked polymers, so long as the porous polymer particles have the above-specified porosity, surface area and pore diameter characteristics.

Examples of suitable polymers used to manufacture the porous particles are polyethylene, polystyrene, poly(vinyl alcohol), poly(methyl methacrylate), poly(methyl acrylate) or polycarbonate. The most preferred polymer particles are divinylbenzene-cross-linked polystyrene particles available from Advanced Polymer Systems, Redwood City, Calif., under the tradename of G 23-57.

The use of the polymer particles as the support provides several advantages over similar olefin polymerization catalyst compositions prepared with refractory oxide supports, such as particulate silica supports. The polymer particles require no dehydration prior to the use thereof in the catalyst synthesis, thereby expediting the synthesis process and reducing the overall cost thereof. However, if desired, they can be dehydrated prior to catalyst synthesis. The polymer particle-based catalyst composition also dries very rapidly after the catalyst synthesis is completed, as compared to similar silica-supported catalyst compositions. Surprisingly, the polymer particle-supported catalysts also have higher activity, at least in the production of high density polyethylene (HDPE), than similar silica-supported catalysts and they are not inactivated by agents commonly thought of as olefin catalyst poisons, such as oxygen and water.

Although the polymer particles can be used as a support in the synthesis of any olefin polymers, such as aromatic or linear olefins, e.g., styrene or ethylene, they are preferably used as supports in the synthesis of alpha-olefin polymerization catalysts. Accordingly, for the purposes of illustration and exemplification, the invention will be described below in conjunction with alpha-olefin catalyst synthesis. However, it will be understood by those skilled in the art that the invention is not limited to alpha-olefin polymerization catalyst compositions.

The polymer particles are utilized as a support in the catalyst synthesis in any convenient manner in which particulate supports of prior art were used to synthesize supported alpha-olefin polymerization catalyst compositions. Thus, for example, the particles can be added to a synthesis vessel, to which is thereafter added a suitable solvent used heretofore for a given catalyst synthesis. Subsequently, suitable catalyst components, such as a magnesium or an organomagnesium composition and a transition metal compound, such as a titanium compound, are added to the synthesis vessel. The solvents used in the synthesis are any solvents used heretofore in Ziegler-Natta alpha-olefin catalyst synthesis, such as aromatic or non-aromatic hydrocarbons, e.g., hexane, isobutane, or ethers, such as tetrahydrofuran. Some solvents may have a tendency to dissolve non-cross-linked polymer particles. For example, tetrahydrofuran will dissolve non-crosslinked polystyrene particles. To prevent the dissolution of the polymer particles by such solvents, the particles must be cross-linked in any suitable manner discussed above. However, uncross-linked polymer particles, e.g., uncross-linked polystyrene particles, may be used with solvents which do not dissolve them.

Similarly, any heretofore known alpha-olefin polymerization processes can be used to polymerize alpha-olefins in the presence of the catalyst compositions of the present invention. Such processes include polymerization carried out in suspension, in solution or in the gas phase (e.g., see Strobel et al, U.S. Pat. No. 4,148,754, column 6, lines 25–31, and Stevens et al, U.S. Pat. No. 3,787,384, col. 5, lines 32–49). However, gas phase polymerizations are preferred, e.g., in stirred bed reactors, and, especially, in fluidized bed reactors.

As discussed above, the porous polymer particulate support can be used to prepare any Ziegler-Natta catalyst compositions. Such catalyst compositions comprise magnesium or a compound thereof, at least one transition metal or a compound or compounds thereof, a halogen or a compound thereof, and a co-catalyst, also known as a catalyst activator.

The magnesium or magnesium compound component of the catalyst is supplied during catalyst synthesis by any magnesium compounds used heretofore in Ziegler-Natta catalyst compositions synthesis. Non-limiting examples of such compounds are magnesium halides, such as $MgCl_2$ or $MgI_2$, or organomagnesium compositions, such as the compositions having the empirical formula $$R_n MgR'_{(2-n)}$$

where R and R' are the same or different $C_1-C_{12}$ hydrocarbyl groups, provided that R' may also be a halogen, and n is 0, 1 or 2.

The transition metal or transition compound component is supplied during catalyst synthesis by any transition metal compounds used heretofore in synthesizing the Ziegler-Natta catalyst compositions. Suitable transition metal compounds are compounds of a transition metal of Group IVA, VA, VIA, VIIA or VIII of the Periodic Chart of the Elements, as published by the Fisher Scientific Company, Catalog Number 5-702-10, 1978. Such compounds are any transition metal compounds used heretofore in Ziegler-Natta catalyst compositions. Non-limiting examples of such transition metal compounds are compounds of titanium, vanadium, molybdenum, zirconium or chromium, e.g., $TiCl_3$, $TiCl_4$, $VCl_3$, $VCl_4$, $VOCl_3$, dialkoxy vanadium dichlorides, $MoCl_5$, $ZrCl_4$ and chromiumacetyl-acetonate. Of these compounds, the compounds of titanium and/or vanadium are preferred, and the compounds of titanium are most preferred. The use of a mixture of transition metal compounds to provide bimetallic catalyst compositions, e.g., titanium and vanadium-containing catalyst compositions, is also expressly contemplated herein.

The Ziegler-Natta catalyst composition also contains a halogen, e.g., bromine or chlorine, preferably chlorine, usually supplied to the catalyst from a halogenated magnesium or halogenated transition metal compound, such as halogenated titanium or halogenated vanadium, and a conventional catalyst activator. The catalyst composition of this invention is not subjected to halogenation, e.g., chlorination treatments.

The thus-formed Ziegler-Natta catalyst component, also referred to herein as a catalyst precursor, is activated with suitable activators, also known as co-catalysts or catalyst promoters. The activators are known in the art and they include any of the materials commonly employed as promoters for olefin polymerization catalyst components containing compounds of the Group IB, IIA, IIB, IIIB and IVB of the Periodic Chart of the Elements, published by the Fisher Scientific Company, Catalog Number 5-702-10, 1978. Examples of such promoters are metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures of promoters can also be employed. Specific examples of useful promoters include n-butyllithium, diethylzinc, di-n-propylzinc, triethylboron, trimethylaluminum, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutyl- aluminum chloride, bromide, and hydride, tetramethylgermanium, and tetraethylgermanium. Organometallic promoters which are preferred for use according to this invention are Group IIIB metal alkyls and dialkyl-halides having 1 to about 20 carbon atoms per alkyl radical. More preferably, the promoter is a trialkylaluminum compound having 1 to about 6 carbon atoms per alkyl radical, and the most preferred promoter is triethylaluminum.

The organometallic promoter is employed in an amount which is at least effective to promote the polymerization activity of the solid component of the catalyst of this invention. Preferably, at least about one part by weight of the promoter is employed per part, by weight, of solid catalyst component, although higher ratios, such as 10:1; 25:1, 100:1 or higher, are also suitable and often give highly beneficial results. In slurry polymerization processes, a portion of the promoter can be employed to pretreat the polymerization medium if desired. Other promoters which can be used are disclosed in Stevens et at, U.S. Pat. No. 3,787,384, column 4, line 45 to column 5, line 12, and in Strobel et al. U.S. Pat. No. 4,148,754, column 4, line 56 to column 5, line 59, the entire contents of both patents being incorporated herein by reference.

The catalyst may be activated in situ by adding the activator and catalyst separately to the polymerization medium. It is also possible to combine the catalyst and activator before the introduction thereof into the polymerization medium, e.g., for up to 2 hours prior to the introduction thereof into the polymerization medium at a temperature of from about −40° to about 100° C.

A suitable activating amount of the activator may be used to promote the polymerization activity of the catalyst. The aforementioned proportions of the activator can also be expressed in terms of the number of moles of activator per gram atom of transition metal in the catalyst of, e.g., from about 1 to about 100 and preferably greater than about 5.

In a preferred embodiment, the catalysts synthesized according to this invention and the process for polymerizing alpha-olefin polymers are those of Nowlin et al, U.S. Pat. Nos. 4,481,301 and 4,605,638, except that the cross-linked polymer particles instead of the solid porous carriers are used as the support and an additional modification, discussed below, is made in the synthesis thereof, in accordance with this invention. The synthesis of the catalysts of the Nowlin et al U.S. Pat. Nos. 4,481,301 and 4,605,638, is modified in accordance with this invention by using so much of the organo-magnesium composition that the final catalyst product contains about 1 to about 50% by weight (wt. %) thereof, and so much of the transition metal compound or compounds, such as titanium, that the final catalyst product contains about 2 to about 70 wt. % thereof. Aside from that modification and the use of the porous polystyrene particles as the support, the synthesis of the aforementioned Nowlin et al catalyst compositions is conducted in the manner set forth in these patents. For purposes of illustration, the modified synthesis of the Nowlin et al, U.S. Pat. No. 4,605,638 catalyst precursor composition is summarized below. The catalyst precursor is synthesized in a process comprising the steps of:

(i) contacting porous, polymer carrier particles with a liquid, said liquid containing at least one organomagnesium composition having the empirical formula $R_nMgR'_{(2-n)}$ where R and R' are the same or different $C_1$–$C_{12}$ hydrocarbyl groups, provided that R' may also be a halogen, and n is a rational number from about 0.5 to 2, (ii) evaporating said liquid from step (i) to obtain a carrier, containing magnesium, in the form of a dry, free-flowing powder; and (iii) reacting said powder of step (ii) with at least one transition metal compound in a liquid medium, the number of moles of said transition metal compound being in excess of the number of moles of said organomagnesium composition in step (i), said transition metal compound being soluble in said liquid medium, and the magnesium being substantially insoluble in said liquid medium, whereby a reacted form of a transition metal which is insoluble in said liquid medium becomes supported on said carrier.

In the most preferred embodiment, the catalysts synthesized according to this invention and the process for polymerizing alpha-olefin polymers are substantially those disclosed by Karol et al, U.S. Pat. No. 4,302,566 and Karol et al, European Published Patent Application (EPA), application No. 84103441.6, filed on Mar. 28, 1984, Publication Number 0 120 503, published on Oct. 3, 1984, except that the polymer particles are used as the support in accordance with this invention.

Thus, the catalysts of the most preferred embodiment of this invention are produced by forming a precursor composition from a magnesium compound, a titanium compound, and an electron donor compound; diluting the precursor composition with particles of the porous polymer carrier or support; and activating the diluted precursor composition with an organoaluminum compound.

The precursor composition is formed by dissolving at least one titanium compound and at least one magnesium compound in at least one electron donor compound at a temperature of from about 20° C. up to the boiling point of the electron donor compound. The titanium compound(s) can be added to the electron donor compound(s) before or after the addition of the magnesium compound(s), or concurrent therewith. The dissolution of the titanium compound(s) and the magnesium compound(s) can be facilitated by stirring, and in some instances by refluxing, these two compounds in the electron donor compound(s). After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 mol to about 10 mols, of the magnesium compound(s) are used per mol of the titanium compound(s) in preparing the precursor composition.

The titanium compound(s) employed in preparing the precursor composition has the structure $Ti(OR)_aX_b$ wherein
R is an aliphatic or aromatic hydrocarbyl group containing from 1 to 14 carbon atoms, or COR' where R' is an aliphatic or aromatic hydrocarbyl group containing from 1 to 14 carbon atoms,
X is selected from the group consisting of Cl, Br, I, and mixtures thereof,
a is 0, 1 or 2, b is 1 to 4 inclusive, and a+b=3 or 4.

Suitable titanium compounds are $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$. $TiCl_3$ is preferred because catalysts containing this material show higher activity at low temperatures and low monomer concentrations.

The magnesium compound(s) employed in preparing the precursor composition has the structure $MgX_2$ wherein X is selected from the group consisting of Cl, Br, I, and mixtures thereof.

Suitable magnesium compounds are $MgCl_2$, $MgBr_2$ and $MgI_2$. Anhydrous $MgCl_2$ is particularly preferred.

The electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds are alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred electron donor compounds are methyl formate, ethyl acetate, butyl acetate, ethyl ether, tetrahydrofuran, dioxane, acetone and methyl ethyl ketone.

After the precursor composition has been prepared it is diluted with polymer carrier material by (1) mechanically mixing or (2) impregnating such composition into the carrier material.

Mechanical mixing of the polymer carrier and precursor composition is effected by blending these materials together using conventional techniques. The blended mixture contains from about 3 to about 50 percent by weight of the precursor composition.

Impregnation of the polymer carrier material with the precursor composition may be accomplished by dissolving the precursor composition in the electron donor compound solvent and then admixing the carrier with the dissolved precursor composition to impregnate the carrier. The solvent is then removed by drying at temperatures up to about 85° C.

The polymer support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

The blended or impregnated precursor composition has the formula $$Mg_mTi(OR)_nX_p[ED]_q$$

wherein
R is an aliphatic or aromatic hydrocarbyl group having 1 to 14 carbon atoms, or COR' wherein R' is also an aliphatic or aromatic hydrocarbyl group having 1 to 14 carbon atoms,
X is selected from the group consisting of Cl, Br, I, and mixtures thereof,
ED is an electron donor compound,
m is 0.5 to 56, preferably 1.5 to 5,
n is 0, 1 or 2,
p is 2 to 116, preferably 6 to 14, and
q is 2 to 85, preferably 3 to 10.

The impregnated carrier material contains from about 3 percent by weight to about 50 percent by weight, preferably from about 10 percent by weight to about 30 percent by weight, of the precursor composition.

To be useful in producing ethylene copolymers, the precursor composition must be activated with a compound capable of transforming the titanium atoms in the precursor composition to a state which will cause ethylene to effectively copolymerize with higher alpha olefins. Such activation is effected by means of an organoaluminum compound having the structure $$Al(R'')_dX'_eH_f$$

wherein
X' is Cl or OR''',
R'' and R''' are the same or different saturated hydrocarbyl groups containing from 1 to 14 carbon atoms,
e is 0 to 1.5,
f is 0 or 1, and
d+e+f=3.

Such activator compounds can be employed individually or in combination thereof and include compounds such as $Al(CH_3)_3$, $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$.

If desired, the precursor composition may be partially activated before it is introduced into the polymerization reactor. However, any activation undertaken outside of the polymerization reactor should be limited to the addition of an amount of activator compound which does not raise the molar ratio of activator compound:electron donor in the precursor composition beyond 1.4:1. Preferably, when activation is effected outside the reactor in this manner, the activator compound is employed in an amount which will provide the precursor composition with an activator compound:electron donor molar ratio of from about 0.1:1 to about 1.0:1. Such partial activation is carried out in a hydrocarbon solvent slurry followed by drying of the resulting mixture, to remove the solvent, at temperatures of from about 20° C. to about 80° C., preferably from about 50° C. to about 70° C. The resulting product is a free-flowing solid particulate material which can be readily fed to the polymerization reactor where the activation is completed with additional activator compound which can be the same or a different compound.

Alternatively, when an impregnated precursor composition is employed, it may, if desired, be completely activated in the polymerization reactor without any prior activation outside of the reactor.

The partially activated or totally unactivated precursor composition and the required amount of activator compound necessary to complete activation of the precursor composition are preferably fed to the reactor through separate feed lines. The activator compound may be sprayed into the reactor in the form of a solution thereof in a hydrocarbon solvent, such as isopentane, hexane, or mineral oil. This solution usually contains from about 2 weight percent to about 30 weight percent of the activator compound. The activator compound is added to the reactor in such amounts as to provide, in the reactor, a total aluminum:titanium molar ratio of from about 10:1 to about 400:1, preferably from about 25:1 to about 60:1.

In the continuous gas phase fluid bed process, discrete portions of the partially activated or totally unactivated precursor composition are continuously fed to the reactor, with discrete portions of the activator compound needed to complete the activation of the partially activated or totally unactivated precursor composition, during the continuing polymerization process in order to replace active catalyst sites that are used up during the course of the reaction.

The molecular weight of the polymer may be controlled in a known manner, e.g., by using hydrogen. Molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

The linear polyethylene polymers prepared in accordance with the present invention are homopolymers of ethylene or copolymers of ethylene with one or more $C_3$–$C_{10}$ alpha-olefins. Thus, copolymers having two monomeric units are possible as well as terpolymers having three monomeric units. Particular, non-limiting examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount at least 1 percent by weight of the polymer. Accordingly, ethylene/propylene copolymers are possible, but not preferred. The most preferred comonomer is 1-hexene.

A particularly desirable method for producing linear low density polyethylene polymers according to the present invention is in a fluid bed reactor. Such a reactor and means for operating the same is described by Levine et al, U.S. Pat. No. 4,011,382, the entire contents of which are incorporated herein by reference, Karol et al, U.S. Pat. No. 4,302,566, and by Nowlin et al, U.S. Pat. No. 4,481,301.

The following Examples further illustrate the essential features of the invention. However, it will be apparent to those skilled in the art that the specific reactants and reaction conditions used in the Examples do not limit the scope of the invention.

EXAMPLE 1

(Titanium-Based Ziegler-Natta Catalyst Synthesis With Polystyrene Support)

Five grams of cross-linked polystyrene microspheres 10–45μ in diameter (supplied by Advanced Polymer Systems, Redwood City, Calif., under the tradename of G 23-57) were added to a three neck, 500 ml round bottom flask fitted with a condenser, stirrer and distillation head. 150 ml of dry solvent (hexane) was added and refluxed for 1 hour after which time the solvent was removed by cannula. 150 ml of fresh solvent was then added and heated to reflux. 3 ml of ethyl magnesium chloride (EtMgCl) (2.1 molar), was slowly added to the flask and allowed to react for 1 hour. After this time, 1 ml of neat $TiCl_4$ (molar ratio of Mg:Ti about 0.7:1) was added very slowly and allowed to reflux for 1 hour. The hexane was then removed by evaporation leaving a free flowing powder.

EXAMPLES 2–3

Ziegler-Natta Catalyst Synthesis With Polystyrene Support

Two more catalyst compositions were synthesized in the manner of Example 1, except that 10 grams of cross-linked polystyrene and 100 ml of solvent were used and that in the catalyst of Example 2, tetrahydrofuran (THF) was used as a solvent, while in Example 3, magnesium dichloride ($MgCl_2$) was used as the source of magnesium.

The three catalyst compositions, along with a comparative catalyst prepared in a manner substantially similar to that of Example 2(c) of Karol et al, EPA 0 120 503 ("comparative" catalyst), were then used to polymerize ethylene or ethylene and 1-hexene in the manner detailed below in Examples 4–10.

EXAMPLES 4–10

Alpha-Olefin Polymerization

All of the polymerization reactions were conducted in a 1 liter (1) slurry reactor in the manner detailed below for Example 4.

To 750 ml of dry n-hexane at 25° C. was added 2 ml of a 25 wt. % solution of triethylaluminum (TEAL) in hexane, 45.5 gm of 1-hexene ($C_6$), and enough hydrogen ($H_2$) from a 250 ml pressure vessel to decrease the vessel pressure by 20 psig (from 50 to 30 psig). The reactor was heated to about 70° C., at which time ethylene was added to saturate the liquids in the reactor. After ethylene saturation was completed, about 0.2 gm of the Example 1 catalyst was added to the reactor and polymerization temperature adjusted to 80° C. The reactor total pressure was maintained at 100 psig by feeding ethylene on demand. The reaction mixture was stirred at 750 RPM. The Al/Ti mole ratio was about 10:1. After 150 gm of the resin was made, the reaction was terminated. Ethylene consumption was measured as a function of time to generate an activity profile for the catalyst.

The results are summarized in Table I.

TABLE I

| | | | Polymerization With Ziegler Catalysts Prepared Using Polystyrene Support | | | | | | | |
|---|---|---|---|---|---|---|---|---|---|---|
| Example No. | Catalyst of Example | Catalyst Synthesis Solvent | Magnesium Source of | Amount | Amount of $TiCl_4$ | Amount of Polystyrene Used (gm) | Productivity (gm resin/gm cat. · 100 psi · hr) | $I_2$ (gm/10 min) | MFR | Resin Density (gm/cc) |
| 4 | 1 | Hexane | EtMgCl | 3 ml | 1 ml | 5 | 1,065 | 1.4 | 39.8 | 0.929[1] |
| 5 | 1 | " | EtMgCl | 3 ml | 1 ml | 5 | 1,547 | 0.55 | 38.5 | 0.951[2] |
| 6 | 1 | " | EtMgCl | 3 ml | 1 ml | 5 | 1,626 | 0.40 | 31.2 | 0.954[3] |
| 7 | 2 | THF | EtMgCl | 10 ml | 3.3 ml | 10 | 1,627 | 3.4 | 36.2 | 0.929 |
| 8 | 2 | THF | EtMgCl | 10 ml | 3.3 ml | 10 | 2,475 | 15.1 | 26.5 | 0.956[4] |
| 9 | 3 | THF | $MgCl_2$ | 1 gm | 1.2 ml | 10 | 1,819 | 3.5 | 30.3 | 0.932 |
| 10 | Comparative | $MgCl_2$ | $MgCl_2$ | — | — | — | 1,101 | 1.7 | 28.3 | 0.935 |

[1] 45.5 gm $C_6^=$ in reactor.
[2] 5.0 gm $C_6^=$ in reactor.
[3] 0 gm $C_6^=$ in reactor.
[4] 6.7 gm $C_6^=$ + 50 psig $H_2$ in reactor.

The comparison of the catalysts of the invention, prepared with polystyrene, to the comparative catalyst (Table I), indicates that the inventive catalysts are more active: average productivity is about 20% higher.

Figure 1:
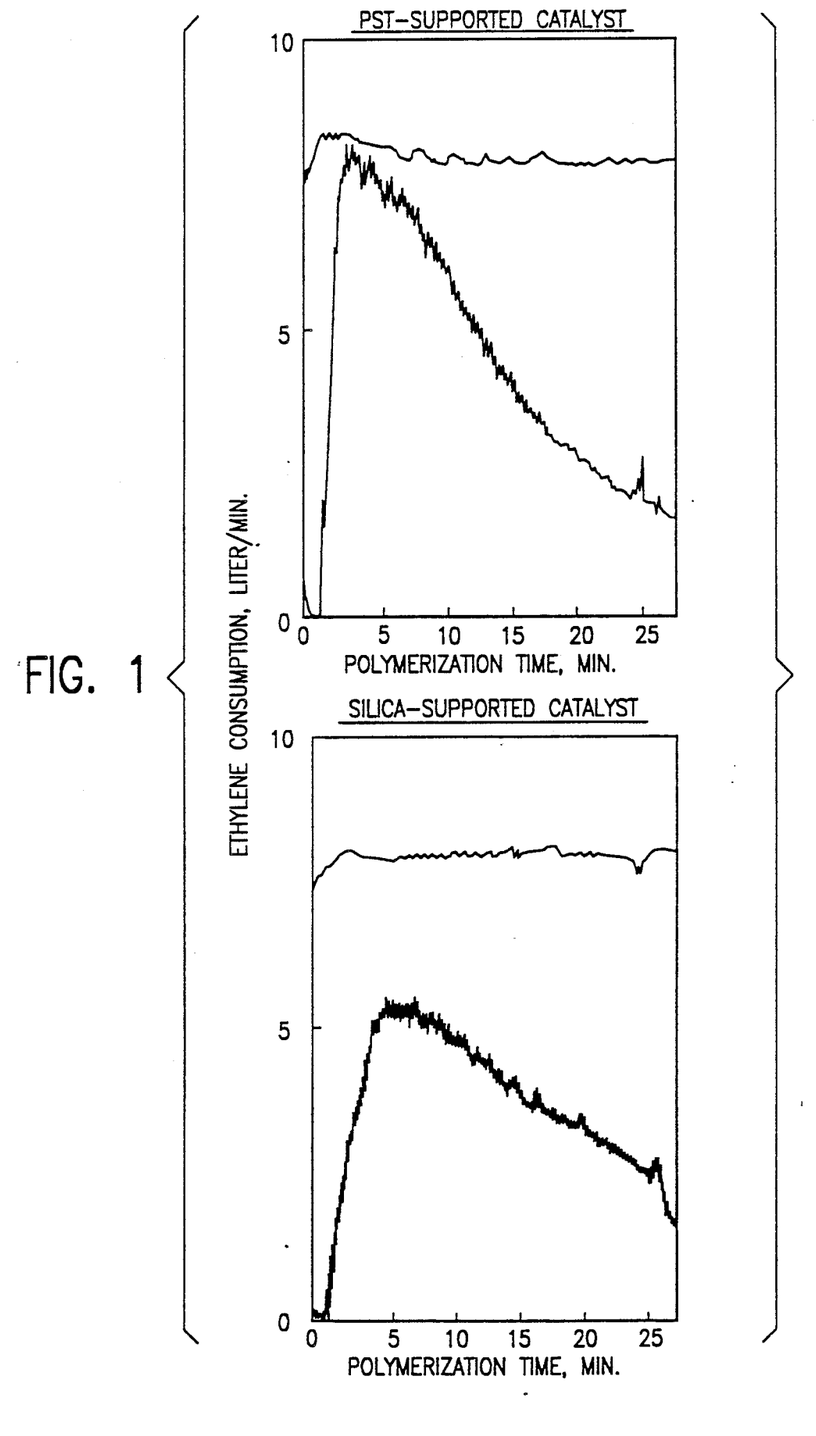
FIG. 1 is a comparison of an activity profile of an exemplary catalyst of the invention supported on porous, cross-linked polystyrene particles with that of a commercial, silica-supported catalyst, both used to polymerize low density polyethylene.
Figure 2:
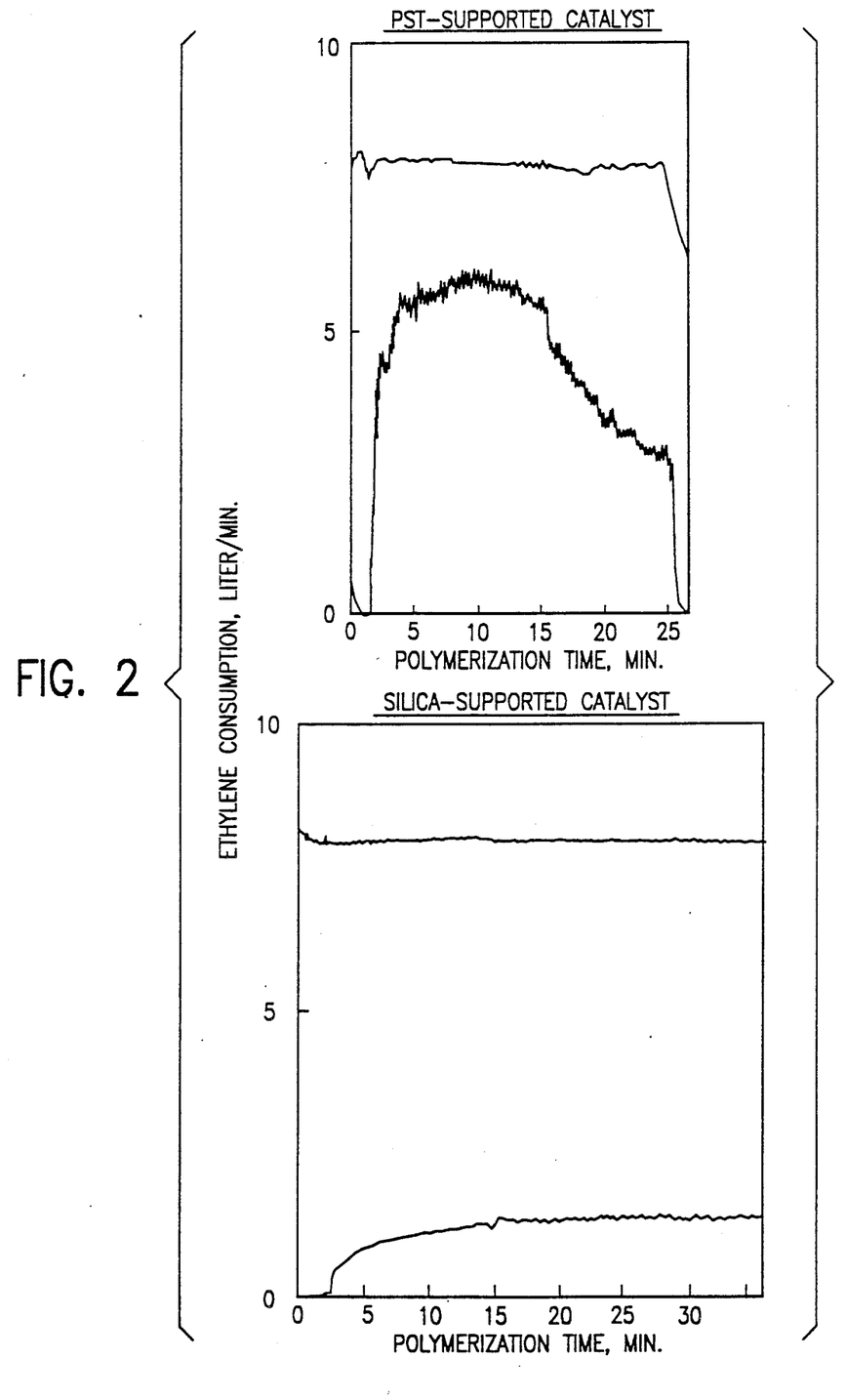
FIG. 2 is a comparison of an activity profile of an exemplary catalyst of the invention supported on porous, cross-linked polystyrene with that of a commercial silica-supported catalyst, both used to polymerize high density polyethylene.

FIG. 1 shows the activity profiles under low density conditions for the polystyrene (PST) and silica-based catalysts. There is no difference in the shapes of the profiles. Both catalysts show a high initial activity which then decays. By comparison, under high density conditions, in which little or no 1-hexene is present during polymerization, large differences are observed in the activity profiles (FIG. 2). The silica-based catalyst has a low initial activity, which gradually increases, which is typical of silica-based Ziegler-Natta catalysts. In contrast, the PST-based catalyst of the invention maintains the high activity that it had under low density conditions.

EXAMPLE 11

Effect of Poisons on Catalyst Activity

The effect of poisons on catalyst properties was tested in this experiment by exposing to air for five (5) minutes a sample of the Example 3 catalyst. After exposure to air, the catalyst sample was used to conduct a low density polymerization under conditions identical to those of Example 9. The air-treated catalyst sample was compared to a different sample of the same catalyst, which was not exposed to air, also used to carry out low density polymerization at the identical conditions. No loss in catalyst activity was observed between the two catalyst samples (Table II).

TABLE II

Effect of Air Exposure on Catalyst Activity

| Catalyst | Productivity gm resin/gm cat. · 100 psi. · hr |
|---|---|
| Example 3 | 1,819 |
| Example 3 - Exposed to air for 5 min. | 1,817 |

EXAMPLE 12

Titanium- and Vanadium-Containing Polystyrene-Supported Catalyst Synthesis 2.5 gm of crosslinked polystyrene microspheres of Example 1 were added to a 500 ml 4 neck round-bottom flask fitted with a condenser and stirrer. 100 ml of dry hexane was added to the flask and the mixture refluxed for 1 hours. The mixture was then cooled to room temperature and the hexane removed by decantation. Another 100 ml of dry hexane was added to the flask, along with 1 ml of 25 wt % of triethylaluminum (TEAL) in hexane, 0.15 ml of dry THF and 0.17 ml $VOCl_3$ (neat). This reaction mixture was refluxed for 1 hour, after which time 0.10 ml of $TiCl_4$ (neat) was added slowly. This mixture was reflexed for 1 hour, after which time the solvent was removed by evaporation to yield a free flowing powder (catalyst).

EXAMPLES 13-15

Ethylene/1-Hexene Polymerization with Example 12 Catalyst

To a 1 gal. autoclave equipped with a stirrer was added, at room temperature, 1,930 ml of dry hexane, 70 ml of 1-hexene, 8 ml of TIBA (tri-isobutylaluminum; 25 wt % in hexane), 0.2 ml chloroform and 50 psig hydrogen (differential pressure) was added from a 500 ml pressure vessel. The amounts of 1-hexene, hexane and hydrogen were adjusted to make resins with different molecular weights and densities. This reaction mixture was heated to 85° C., at which time ethylene was introduced into the reactor. After waiting for a few minutes for the ethylene to saturate the liquids, about 0.2 gm of the Example 12 catalyst was added to the autoclave. The reaction temperature was maintained at 85° C., the reactor total pressure at 150 psig, and the stirrer speed at 900 RPM. Ethylene consumption was measured as a function of time in order to generate an activity profile for the catalyst. Results are summarized in Table III.

suitable values of resin density, flow index and melt flow ratio.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A Ziegler-Natta catalyst ethylene copolymer production comprising a
    titanium metal, a titanium metal compound or admixtures thereof; and
    a particulate porous support,
        wherein the particulate porous support comprises porous polymer particles
            wherein the porous polymer particles have a pore volume of at least about 0.1 cc/gm; and
            wherein the porous polymer particles have a surface area of at least about 20 $m^2$/gm.

2. A catalyst composition of claim 1, wherein the porous polymer particles are made from polyethylene, polystyrene, poly(vinyl alcohol), poly(methyl methacrylate), poly(methyl acrylate) or polycarbonate.

3. A catalyst composition of claim 2, wherein the porous polymer particles are made from polystyrene.

4. A catalyst composition of claim 3, wherein the polystyrene particles are cross-linked and chemically inert.

5. A catalyst composition of claim 4, wherein the polystyrene particles are substantially spherical in shape.

6. A catalyst composition of claim 5, wherein the polystyrene particles have a diameter of about 10 to about 150 microns.

7. A catalyst composition of claim 1, wherein the porous polymer particles have an average pore diameter (PD) of at least about 20 A, wherein PD is the average pore diameter in angstroms and is determined from the formula $$PD = \frac{PV}{SA} \times 40,000.$$

where PV is pore volume in cm/gm and SA is surface area in $m^2$/gm.

8. A catalyst composition of claim 2, wherein the porous polymer particles have an average pore diameter (PD) of at least about 20 A, wherein PD is the aver-

TABLE III

| Example | Amount of 1-Hexene (ml) | Amount of $H_2$ (psig) | Amount of Hexane (ml) | Productivity (gm resin/gm cat. · 100 psi · hr) | Resin Density (gm/cc) | Resin Flow Index $I_{21}$ gm/10 min | Resin Melt Flow Ratio ($I_{21}/I_2$) |
|---|---|---|---|---|---|---|---|
| 13 | 70 | 50 | 1930 | 1,311 | 0.943 | 4.33 | 140 |
| 14 | 60 | 70 | 1940 | 1,142 | 0.947 | 25.1 | 120 |
| 15 | 60 | 55 | 1940 | 722 | 0.949 | 14.5 | 115 |

Products made in Examples 13 and 15 are suitable for high molecular weight/high density film applications since they have suitable values of resin density, flow index and melt flow ratio.

The product made in Example 14 is suitable for blow molding applications, such as for the production of household and industrial containers (HIC), since it has age pore diameter in angstroms and is determined from the formula $$PD = \frac{PV}{SA} \times 40{,}000.$$

where PV is pore volume in cm/gm and SA is surface area in m$^2$/gm.

9. The catalyst composition of claim 3, wherein the porous polymer particles have an average pore diameter (PD) of at least about 20 A, wherein PD is the average pore diameter in angstroms and is determined from the formula $$PD = \frac{PV}{SA} \times 40{,}000,$$

where PV is pore volume in cm/gm and SA is surface area in m$^2$/gm.

10. A catalyst composition of claim 4, wherein the porous polymer particles have an average pore diameter (PD) of at least about 20 A, wherein PD is the average pore diameter in angstroms and is determined from the formula $$PD = \frac{PV}{SA} \times 40{,}000.$$

where PV is pore volume in cm/gm and SA is surface area in m$^2$/gm.

11. A catalyst composition of claim 5, wherein the porous polymer particles have an average pore diameter (PD) of at least about 20 A, wherein PD is the average pore diameter in angstroms and is determined from the formula $$PD = \frac{PV}{SA} \times 40{,}000.$$

where PV is pore volume in cm/gm and SA is surface area in m$^2$/gm.

12. A catalyst composition of claim 6, wherein the porous polymer particles have an average pore diameter (PD) of at least about 20 A, wherein PD is the average pore diameter in angstroms and is determined from the formula $$PD = \frac{PV}{SA} \times 40{,}000.$$

where PV is pore volume in cm/gm and SA is surface area in m$^2$/gm.

13. The catalyst of claim 3, wherein the titanium metal compound is a tetravalent titanium compound.

14. The catalyst of claim 13, wherein the titanium metal compound is titanium tetrachloride.

15. The catalyst of claim 9, wherein the titanium metal compound is a tetravalent titanium compound.

16. The catalyst of claim 15, wherein the titanium metal compound is titanium tetrachloride.

17. The catalyst of claim 1, which further includes magnesium, a magnesium compound or admixtures thereof wherein the magnesium compound is provided by a reagent which has an empirical formula:

$$R_n MgR'_{(2-n)}$$

where R and R' are the same or different and they are $C_1$–$C_{12}$ hydrocarbyl groups, provided that R' may also be a halogen, and n is 0, 1 or 2.

18. The catalyst of claim 3, which further includes magnesium, a magnesium compound or admixtures thereof wherein the magnesium compound is provided by a reagent which has an empirical formula:

$$R_n MgR'_{(2-n)}$$

where R and R' are the same or different and they are $C_1$–$C_{12}$ hydrocarbyl groups, provided that R' may also be a halogen, and n is 0, 1 or 2.

19. The catalyst of claim 3, which further includes magnesium, a magnesium compound or admixtures thereof wherein the magnesium compound is provided by a reagent which has an empirical formula:

$$R_n MgR'_{(2-n)}$$

where R and R' are the same or different and they are $C_1$–$C_{12}$ hydrocarbyl groups, provided that R' may also be a halogen, and n is 0, 1 or 2.

20. The catalyst of claim 14, which further includes magnesium, a magnesium compound or admixtures thereof wherein the magnesium compound is provided by a reagent which has an empirical formula:

$$R_n MgR'_{(2-n)}$$

where R and R' are the same or different and they are $C_1$–$C_{12}$ hydrocarbyl groups, provided that R' may also be a halogen, and n is 0, 1 or 2.

21. The catalyst of claim 16, which further includes magnesium, a magnesium compound or admixtures thereof wherein the magnesium compound is provided by a reagent which has an empirical formula:

$$R_n MgR'_{(2-n)}$$

where R and R' are the same or different and they are $C_1$–$C_{12}$ hydrocarbyl groups, provided that R' may also be a halogen, and n is 0, 1 or 2.

22. The catalyst of claim 1, which further includes a catalyst activator wherein the catalyst activator comprises one or more compounds of at least one element of Group IB, IIA, IIB, IIIB, IVB or mixtures thereof of the Periodic Chart of the Elements.

23. The catalyst of claim 17, which further includes a catalyst activator wherein the catalyst activator comprises one or more compounds of at least one element of Group IB, IIA, IIB, IIIB, IVB or mixtures thereof of the Periodic Chart of the Elements.

24. The catalyst of claim 18, which further includes a catalyst activator wherein the catalyst activator comprises one or more compounds of at least one element of Group IB, IIA, IIB, IIIB, IVB or mixtures thereof of the Periodic Chart of the Elements.

25. The catalyst of claim 19, which further includes a catalyst activator wherein the catalyst activator comprises one or more compounds of at least one element of Group IB, IIA, IIB, IIIB, IVB or mixtures thereof of the Periodic Chart of the Elements.

26. A Ziegler-Natta catalyst for ethylene copolymer production comprising a titanium metal, a titanium metal compound or admixtures thereof; and a particulate porous support, wherein the particulate porous support is formed of porous polystyrene particles wherein the porous polystyrene particles have a pore volume of at least about 0.1 cc/gm; and wherein the porous polystyrene particles have a surface area of at least about 1 m$^2$/gm to 1000 m$^2$/gm; and wherein the porous polystyrene particles has pores and an average pore diameter of at least about 10 A.

27. The catalyst of claim 26, wherein the titanium metal compound is a tetravalent titanium compound.

28. The catalyst of claim 27, wherein the titanium metal compound is titanium tetrachloride.

29. The catalyst of claim 26, which further includes magnesium, a magnesium compound or admixtures thereof wherein the magnesium compound is provided as a reagent which has an empirical formula:

$$R_nMgR'_{(2-n)}$$

where R and R' are the same or different and they are $C_1$-$C_{12}$ hydrocarbyl groups, provided that R' may also be a halogen, and n is 0, 1 or 2.

30. The catalyst of claim 29, wherein the titanium metal compound is a tetravalent titanium compound.

31. The catalyst of claim 30, wherein the titanium metal compound is titanium tetrachloride.

32. The catalyst of claim 29, which is prepared in a process comprising the steps of:

(i) contacting the porous polystyrene particles with a liquid containing said reagent having the empirical formula:

$$R_nMgR'_{(2-n)}$$

where R and R' are the same or different and they are $C_1$-$C_{12}$ hydrocarbyl groups, provided that R' may also be a halogen, and n is 0, 1 or 2;

(ii) evaporating said liquid from step (i) to produce a supported magnesium composition in the form of a dry, free-flowing powder; and (iii) reacting said powder of step (ii) with at least one titanium metal compound in a liquid medium, the number of moles of said titanium metal compound being in excess of the number of moles of magnesium supported on said polystyrene particles, said titanium metal compound being soluble in said liquid medium, and said supported magnesium composition being substantially insoluble in said liquid medium.

33. The catalyst of claim 32, wherein the transition metal compound is a tetravalent titanium compound.

34. The catalyst of claim 33, wherein the titanium metal compound is titanium tetrachloride.

35. The catalyst of claim 26, which further includes a catalyst activator wherein the catalyst activator comprises one or more compounds of at least one element of Group IB, IIA, IIB, IIIB, IVB or mixtures thereof of the Periodic Chart of the Elements.

36. The catalyst of claim 32, which further includes a catalyst activator wherein the catalyst activator comprises one or more compounds of at least one element of Group IB, IIA, IIB, IIIB, IVB or mixtures thereof of the Periodic Chart of the Elements.

37. The catalyst of claim 36, wherein the porous polymer particles have an average pore diameter of at least about 20 A.

38. The catalyst of claim 37, wherein the porous polymer particles have an average pore diameter of at least about 50 A.

39. The catalyst of claim 32, wherein the steps include slurrying the polystyrene particles in a non-Lewis base liquid; and adding to the slurry the reagent in the form of an ether solution thereof.

40. The catalyst of claim 39, wherein the ether is tetrahydrofuran.

41. The catalyst of claim 32, wherein the polystyrene is divinylbenzene crosslinked polystyrene.

42. The catalyst of claim 26, wherein the surface area is at least 4 m$^2$/g.

43. The catalyst of claim 26, wherein the surface area is at least 20 m$^2$/g.

* * * * *